US006930855B2

(12) United States Patent
Gupta et al.

(10) Patent No.: US 6,930,855 B2
(45) Date of Patent: Aug. 16, 2005

(54) SYSTEM AND METHOD FOR EXCHANGING TAPE CARTRIDGES BETWEEN AUTOMATED TAPE CARTRIDGE LIBRARIES

(75) Inventors: Sanjiv Gupta, Superior, CO (US); Kenneth L. Manes, Brighton, CO (US)

(73) Assignee: Storage Technology Corporation, Louisville, CO (US)

( * ) Notice: Subject to any disclaimer, the term of this patent is extended or adjusted under 35 U.S.C. 154(b) by 0 days.

(21) Appl. No.: 10/829,730

(22) Filed: Apr. 22, 2004

(65) Prior Publication Data

US 2004/0196587 A1 Oct. 7, 2004

Related U.S. Application Data

(62) Division of application No. 10/033,867, filed on Dec. 27, 2001, now Pat. No. 6,751,040.
(60) Provisional application No. 60/302,248, filed on Jun. 29, 2001.

(51) Int. Cl.[7] .............................................. G11B 15/68
(52) U.S. Cl. ......................................................... 360/92
(58) Field of Search ........................................... 360/92

(56) References Cited

U.S. PATENT DOCUMENTS

| | | | |
|---|---|---|---|
| 3,392,244 A | 7/1968 | Hillmann | |
| 3,733,446 A | 5/1973 | Colovas et al. | |
| 3,881,053 A | 4/1975 | Lemelson | |
| 3,970,775 A | 7/1976 | Lemelson | |
| 4,087,839 A | 5/1978 | Lemelson | |
| 4,928,245 A | 5/1990 | Moy et al. | |
| 4,945,429 A | 7/1990 | Munro et al. | |
| 5,045,646 A | 9/1991 | Musachio | |
| 5,297,484 A | 3/1994 | Piserchia et al. | |
| 5,333,982 A | 8/1994 | Tanizawa et al. | |

(Continued)

FOREIGN PATENT DOCUMENTS

| | | |
|---|---|---|
| DE | 40 28 059 A1 | 3/1992 |
| EP | 0 288 165 A2 | 10/1988 |
| EP | 0 289 986 A2 | 11/1988 |
| EP | 0 982 724 A2 | 3/2000 |
| EP | 0 989 550 A1 | 3/2000 |
| WO | WO85 / 02051 | 5/1985 |

OTHER PUBLICATIONS

"L180 Tape Library, General Information Manual," © 1999 Storage Technology Corp., Louisville, CO.

*Primary Examiner*—Craig A. Renner
(74) *Attorney, Agent, or Firm*—Brooks Kushman P.C.

(57) ABSTRACT

A system and method for exchanging tape cartridges between two automated tape cartridge libraries. A carriage assembly carries cartridges back and forth between the libraries. The carriage assembly includes a cartridge transport cell, has a vertical axis, and cooperates with pass through ports in the libraries for providing access to tape cartridge storage cells in the libraries. A guide structure extends between the libraries for supporting the carriage assembly. The guide structure defines a linear path and has first and second sides substantially parallel to the linear path which define an envelope. The carriage assembly is driven along the guide structure, and automatically rotates about the substantially vertical axis. The cartridge transport cell is accessible by robotic devices in the libraries when the carriage assembly is aligned with the pass through ports. The carriage assembly rotates substantially within the envelope as it is driven along the guide structure.

10 Claims, 14 Drawing Sheets

U.S. PATENT DOCUMENTS

| | | | |
|---|---|---|---|
| 5,429,470 A | 7/1995 | Nicol et al. | |
| 5,503,260 A | 4/1996 | Riley | |
| 5,544,146 A | 8/1996 | Luffel et al. | |
| 5,608,275 A | 3/1997 | Khosrowpour | |
| 5,690,197 A | 11/1997 | Suganuma et al. | |
| 5,700,125 A | 12/1997 | Falace et al. | |
| 5,867,003 A | 2/1999 | Hashimoto et al. | |
| 5,870,245 A | 2/1999 | Kersey et al. | |
| 5,914,919 A | 6/1999 | Fosler et al. | |
| 5,917,253 A | 6/1999 | Rusnack | |
| 5,927,464 A | 7/1999 | Clark et al. | |
| 5,936,318 A | 8/1999 | Weiler et al. | |
| 5,936,796 A | 8/1999 | Haneda | |
| 5,993,222 A | 11/1999 | Nicolette et al. | |
| 6,011,669 A | 1/2000 | Apple et al. | |
| 6,025,972 A | 2/2000 | Schmidtke et al. | |
| 6,059,509 A | 5/2000 | Ostwald | |
| 6,068,436 A | 5/2000 | Black et al. | |
| 6,109,568 A | 8/2000 | Gilbert et al. | |
| 6,144,391 A | 11/2000 | Hinson et al. | |
| 6,153,999 A | 11/2000 | Borrego | |
| 6,175,539 B1 | 1/2001 | Holmquist et al. | |
| 6,222,699 B1 | 4/2001 | Luffel et al. | |
| 6,230,861 B1 | 5/2001 | Cornic | |
| 6,231,291 B1 | 5/2001 | Mueller et al. | |
| 6,250,442 B1 | 6/2001 | Perraud et al. | |
| 6,259,580 B1 | 7/2001 | Schmidtke et al. | |
| 6,262,863 B1 | 7/2001 | Ostwald et al. | |
| 6,264,017 B1 | 7/2001 | Evans | |
| 6,304,798 B1 | 10/2001 | Carpenter | |
| 6,327,519 B1 | 12/2001 | Ostwald et al. | |
| 6,360,860 B1 | 3/2002 | Van Zijverden et al. | |
| 6,381,517 B1 | 4/2002 | Butka et al. | |
| 6,396,391 B1 | 5/2002 | Binder | |
| 6,404,585 B2 | 6/2002 | Schmidtke et al. | |
| 6,441,991 B2 | 8/2002 | Ostwald et al. | |
| 6,457,928 B1 | 10/2002 | Ryan | |
| 6,480,759 B1 | 11/2002 | Ostwald et al. | |
| 6,488,462 B1 | 12/2002 | Williams | |
| 6,490,122 B1 | 12/2002 | Mueller et al. | |
| 6,510,020 B1 | 1/2003 | Holmquist et al. | |
| 6,574,173 B1 * | 6/2003 | Manes | 369/30.48 |

* cited by examiner

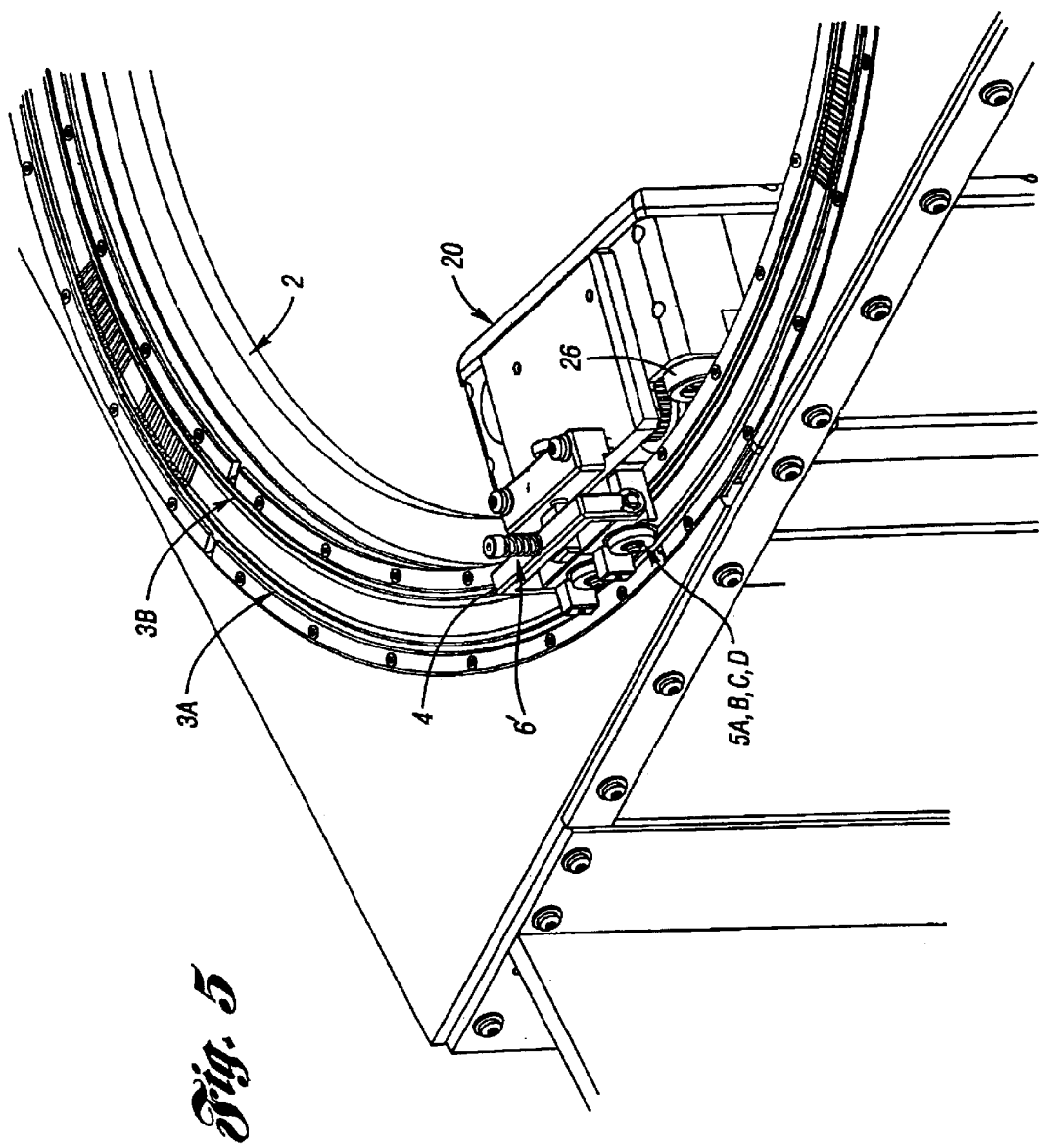

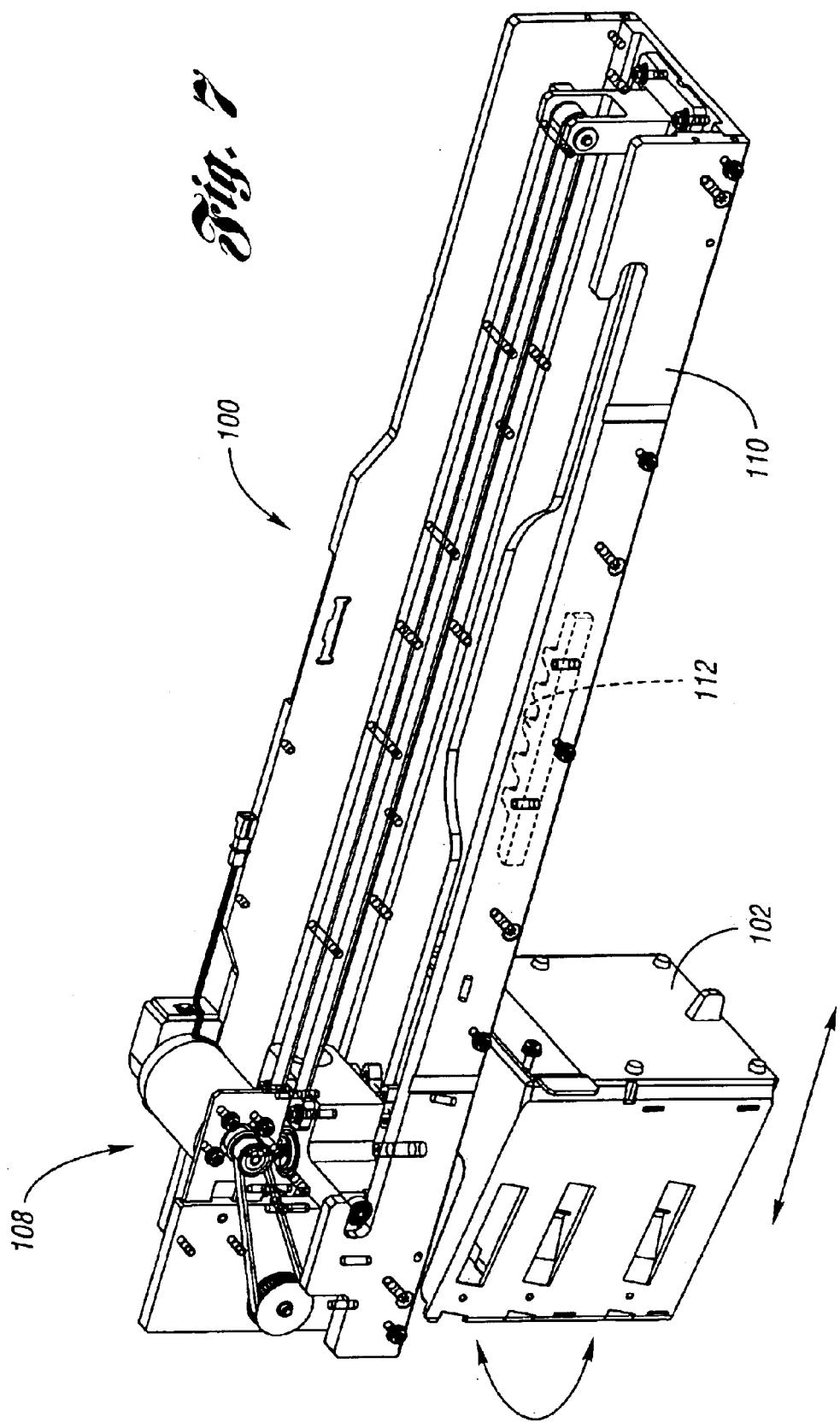

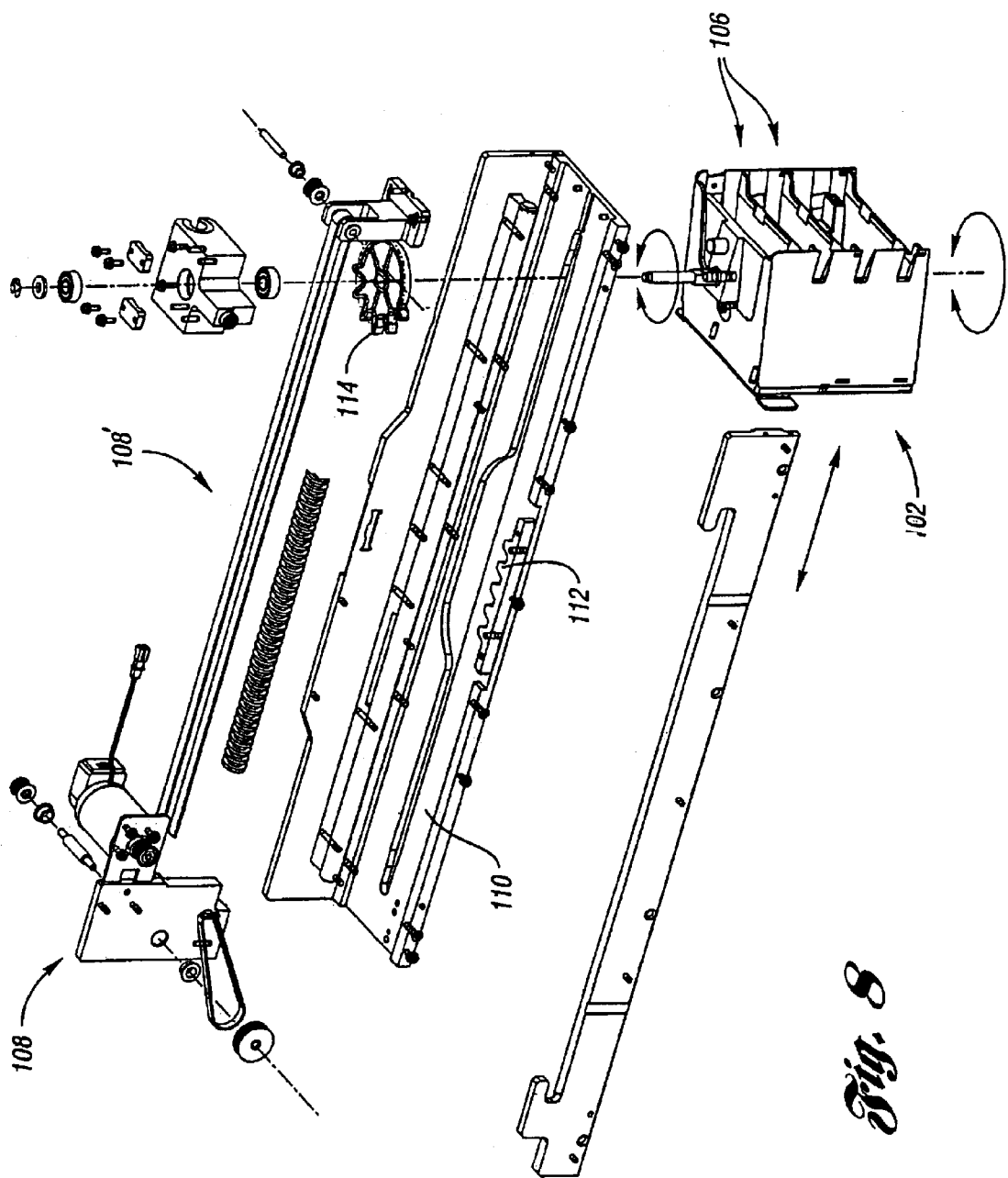

SYSTEM AND METHOD FOR EXCHANGING TAPE CARTRIDGES BETWEEN AUTOMATED TAPE CARTRIDGE LIBRARIES

CROSS-REFERENCE TO RELATED APPLICATIONS

This application is a divisional of application Ser. No. 10/033,867 filed on Dec. 27, 2001 now U.S. Pat. No. 6,751,040, which claims the benefit of U.S. provisional application Ser. No. 60/302,248 filed Jun. 29, 2001.

BACKGROUND OF THE INVENTION

1. Field of the Invention

The present invention relates generally to the exchange of tape cartridges between tape cartridge libraries and, more particularly, to a system and method for exchanging tape cartridges between automated tape cartridge libraries linked in a library system.

2. Background

Current automated libraries for tape cartridges typically include arrays of multiple storage cells housing the tape cartridges, as well as multiple media drives. Multiple automated robotic devices may be used to move tape cartridges between the various storage cells and media drives within a library. The use of multiple robotic devices raises various problems concerning the distribution of power to such robotic devices. In prior art automated tape cartridge libraries, the movement of the robotic devices is restricted by wire cable connections used for providing such power. Such cabling can prevent the robotic devices from crossing paths, or from continuous movement in one direction around the library without the necessity of ultimately reversing direction.

Such problems can be overcome through the use of power distribution strips or rails. A robotic device traveling over a given route may used fixed conductive strips or rails to supply power to the robotic device, which itself is provided with brushes or wheels that contact the conductive strips or rails in order to conduct power to the robotic device. The integration of such conductive strips or rails into the automated tape cartridge library, in conjunction with brush or wheel contacts provided on the robotic devices, allows for greater freedom of movement of the robotic devices. Moreover, such power distribution systems also provide for modular and extensible power distribution to robotic devices as library configurations change, or as libraries are connected in a modular fashion to form library systems.

In that regard, a number of relatively large automated tape cartridge libraries are known having, for example, between 1000 and 2500 cartridge storage cells. Relatively smaller automated tape cartridge libraries, having for example on the order of 700 cartridge storage cells, are also known. For some users, as storage requirements increase, a smaller automated tape cartridge library may have to be replaced with a larger automated library, often at considerable expense. As a result, there exists a need to allow such smaller automated libraries to be linked together to create larger library systems having, for example, on the order of 1400 cartridge storage cells.

It is known to link the above described larger automated libraries using a variety of pass-through ports and cartridge exchange mechanisms. For example, to ensure maximum access to data stored in the tape cartridges, multiple paths are created between larger automated libraries that employ cam or screw driven cartridge exchange devices. As such devices are located entirely or substantially within a library, little floor space in a data center is compromised by the device. However, the use of multiple paths and interior cartridge exchange devices result in the loss of a large number of cartridge storage cells in each library.

Alternatively, multiple larger automated libraries can be linked linearly to improve access to data. In such configurations, gravity driven cartridge exchange devices are employed between linked libraries. In operation, a tape cartridge is delivered to the cartridge exchange device by a robotic device in one of the libraries. The weight of the cartridge causes the exchange device to rotate and deliver the cartridge to the linked library, where it can be retrieved by another robotic device in that library. This configuration does not result in the loss of large number of storage cells in each library, and only minimally affects floor space. However, only a single cartridge may be passed at a time and, because the exchange device is gravity driven, another path must be provided to exchange cartridges in the opposite direction between the linked libraries. Moreover, more complex host software which sees the linked libraries as a single library, such as Automated Cartridge System Library Server (ACSLS), may be required to control the multiple linked libraries.

The pass-through ports and cartridge exchange mechanisms used in linking the relatively larger automated libraries, however, are not suitable for use in linking the relatively smaller automated libraries in that they do not meet the form factors (e.g., orientation, floor space) required by users needing 1400 cartridge storage cells. Moreover, pass-through ports and cartridge exchange devices that result in the loss of large numbers of cartridge storage cells are unacceptable because such a loss represents a significant percentage of storage space in such smaller libraries. Still further, the development of new tape cartridges having differing weights raises concerns as to the ability of gravity driven cartridge exchange devices to reliably transfer all types of cartridges.

Thus, there exist a need for an improved cartridge exchange mechanism for use in linked automated libraries. Such an improved mechanism would preferably minimize the number of storage cells that may be lost as a result of linking automated libraries, as well as preferably minimize the amount of space required for linking such libraries. Such an improved mechanism would also preferably be capable of reliably transferring a wide variety of cartridge types.

SUMMARY OF THE INVENTION

Accordingly, the present invention provides an improved system and method for exchanging tape cartridges between first and second tape cartridge libraries.

According to the present invention, then, in an automated tape cartridge library system having a first library and a second library, each of the first and second libraries having a plurality of storage cells for housing tape cartridges and a robotic device for moving the tape cartridges in the library, a system is provided for exchanging tape cartridges between the first and second libraries. The system comprises a carriage assembly for carrying tape cartridges from the first library to the second library and from the second library to the first library, the carriage assembly comprising at least one cartridge transport cell adapted to cooperate with a first pass through port in the first library for providing access to the plurality of storage cells in the first library and a second pass through port in the second library for providing access to the plurality of storage cells in the second library. The system further comprises a guide structure extending between the first and second libraries for supporting the carriage assembly, the guide structure defining an envelope. The system still further comprises a drive mechanism for driving the carriage assembly along the guide structure between the first and second pass through ports, and a rotation mechanism for rotating the carriage assembly. The at least one cartridge transport cell is accessible by the robotic device of the first library when the carriage assembly is aligned with the first pass through port, the rotation mechanism automatically rotates the carriage assembly substantially within the envelope as the drive mechanism drives the carriage assembly along the guide structure between the first and second libraries, and the at least one cartridge transport cell is accessible by the robotic device of the second library when the carriage assembly is aligned with the second pass through port. The rotation mechanism comprises a first toothed member and a second toothed member cooperating to rotate the carriage assembly between a first position for alignment with the first pass through port and a second position for alignment with the second pass through port.

Also according to the present invention, in an automated tape cartridge library system having a first library and a second library, each of the first and second libraries having a plurality of storage cells for housing tape cartridges and a robotic device for moving the tape cartridges in the library, a method is provided for exchanging tape cartridges between the first and second libraries. The method comprises providing a carriage assembly for carrying tape cartridges from the first library to the second library and from the second library to the first library, the carriage assembly comprising at least one cartridge transport cell, wherein the carriage assembly has a substantially vertical axis and is adapted to cooperate with a first pass through port in the first library for providing access to the plurality of storage cells in the first library and a second pass through port in the second library for providing access to the plurality of storage cells in the second library. The method further comprises providing a guide structure extending between the first and second libraries for supporting the carriage assembly, the guide structure defining a linear path and having first and second sides substantially parallel to the linear path, the first and second sides defining an envelope. The method still further comprises providing means for driving the carriage assembly along the guide structure between the first and second pass through ports, and providing means for rotating the carriage assembly about the substantially vertical axis, wherein the at least one cartridge transport cell is accessible by the robotic device of the first library when the carriage assembly is aligned with the first pass through port, the rotating means automatically rotates the carriage assembly substantially within the envelope as the driving means drives the carriage assembly along the guide structure between the first and second libraries, and the at least one cartridge transport cell is accessible by the robotic device of the second library when the carriage assembly is aligned with the second pass through port.

The above features, and other features and advantages of the present invention are readily apparent from the following detailed descriptions thereof when taken in connection with the accompanying drawings.

BRIEF DESCRIPTION OF THE DRAWINGS

FIGS. 3–6 are perspective, side and cross-sectional views, respectively, of a robotic device for use in an automated tape cartridge library having brush and wheel power distribution;

FIG. 7 is a perspective view of a cartridge exchange device for use in an automated tape cartridge library system according to the present invention;

FIG. 8 is an exploded view of a cartridge exchange device for use in an automated tape cartridge library system according to the present invention;

DETAILED DESCRIPTION OF THE PREFERRED EMBODIMENT(S)

With reference to the Figures, the preferred embodiments of the present invention will now be described in greater detail. The present application incorporates by reference herein commonly owned U.S. patent application Ser. Nos. 10/034,972, 10/033,944, 10/034,904 10/033,942, and 10/034,584, all filed on the same date as the parent application.

As previously noted, current automated libraries for tape cartridges typically include arrays of multiple storage cells housing the tape cartridges, as well as multiple media drives. Multiple automated robotic devices may be used to move tape cartridges between the various storage cells and media drives within a library. As also noted previously, the use of multiple robotic devices raises various problems concerning the distribution of power thereto. In prior art automated tape cartridge libraries, the movement of the robotic devices is restricted by wire cable connections used for providing such power. Such cabling can prevent the robotic devices from crossing paths, or from continuous movement in one direction around the library without the necessity of ultimately reversing direction.

Such problems can be overcome through the use of power distribution strips or rails. A robotic device traveling over a given route may used fixed conductive strips or rails to supply power to the robotic device, which itself is provided with brushes or wheels that contact the conductive strips or rails in order to conduct power to the robotic device. The integration of such power distribution strips or rails into the automated tape cartridge library, in conjunction with brush or wheel contacts provided on the robotic devices, allows for greater freedom of movement of the robotic devices, as well as for modular and extensible power distribution to robotic devices as library configurations change, or as libraries are connected in a modular fashion to form library systems.

Figure 1:
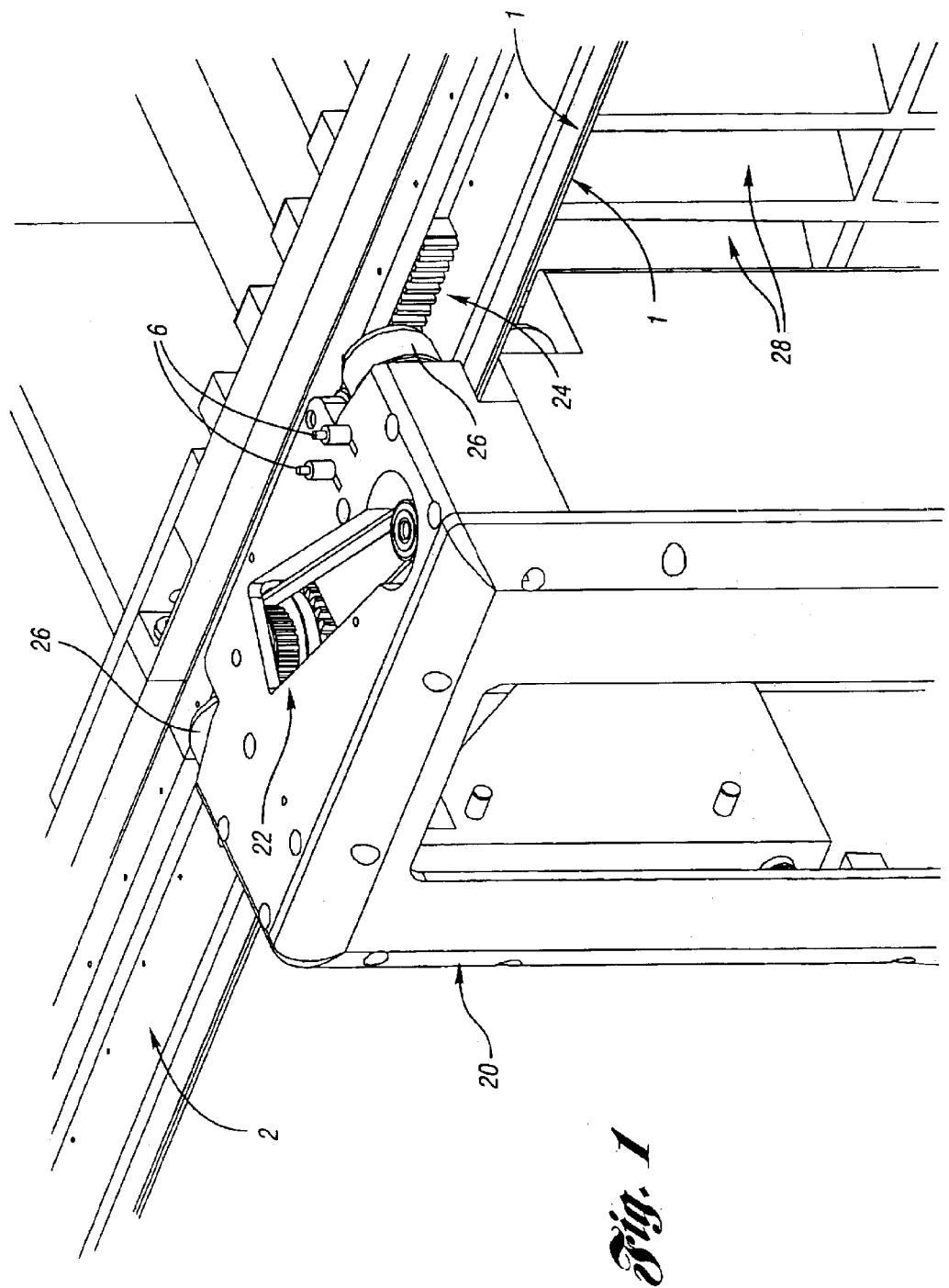
FIG. 1 is a perspective view of a robotic device for use in an automated tape cartridge library having brush and strip power distribution.
Figure 2A:
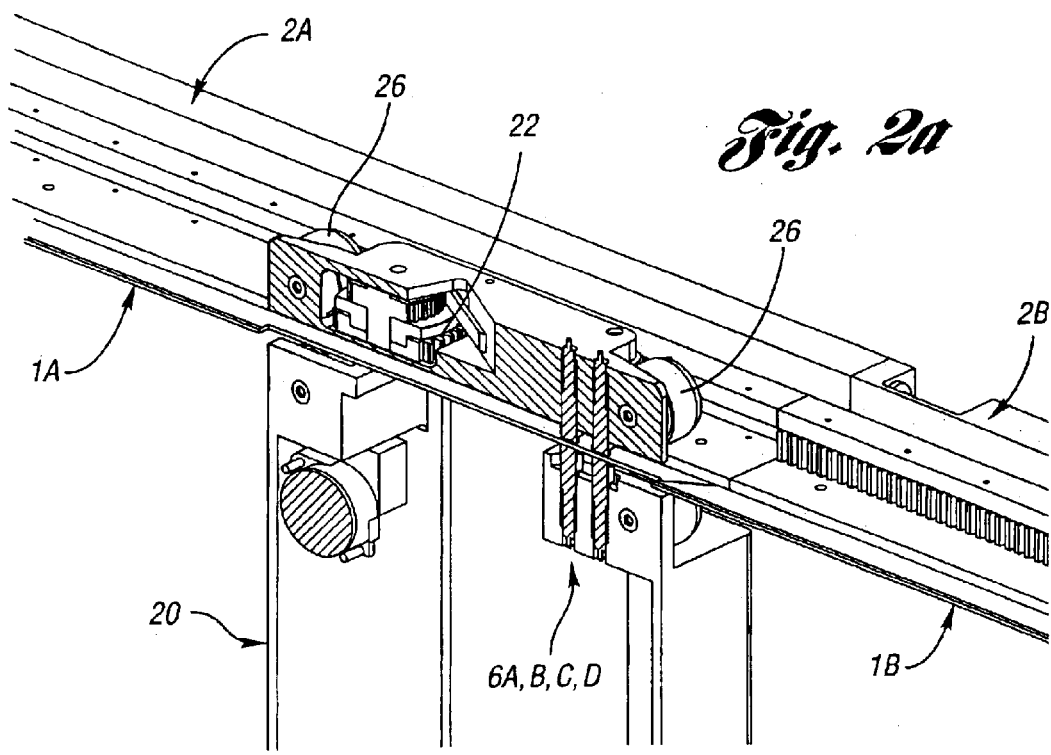
FIGS. 2a and 2b are partial cross-sectional views of a robotic device for use in an automated tape cartridge library having brush and strip power distribution.
Figure 2B:
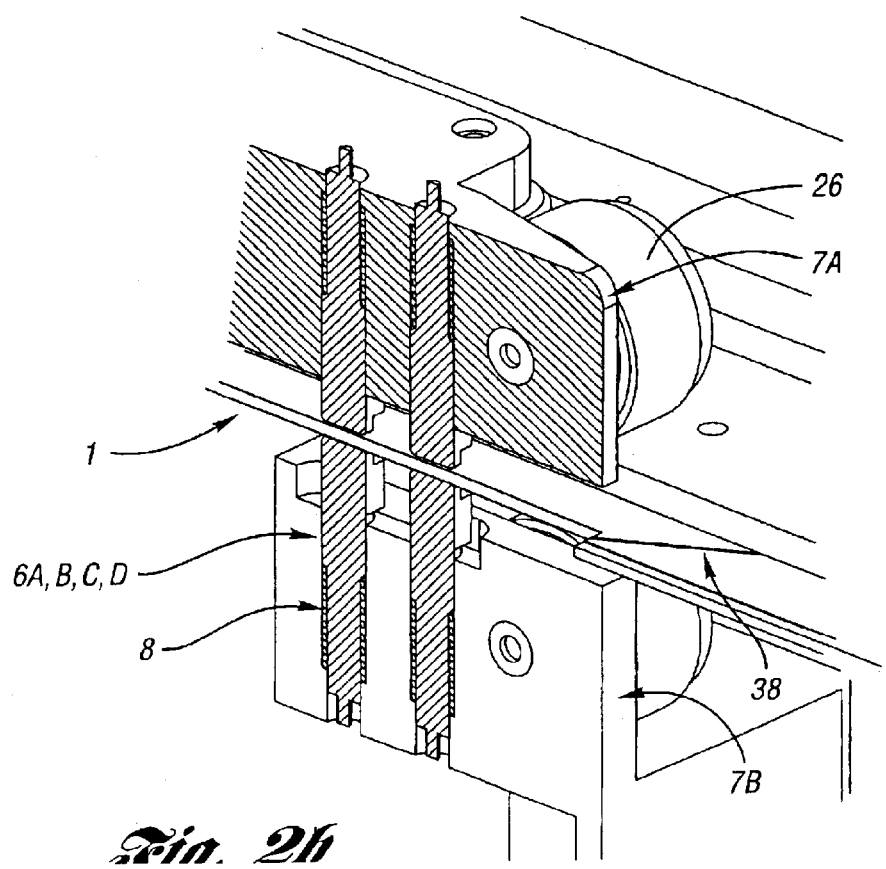
Figure 3:
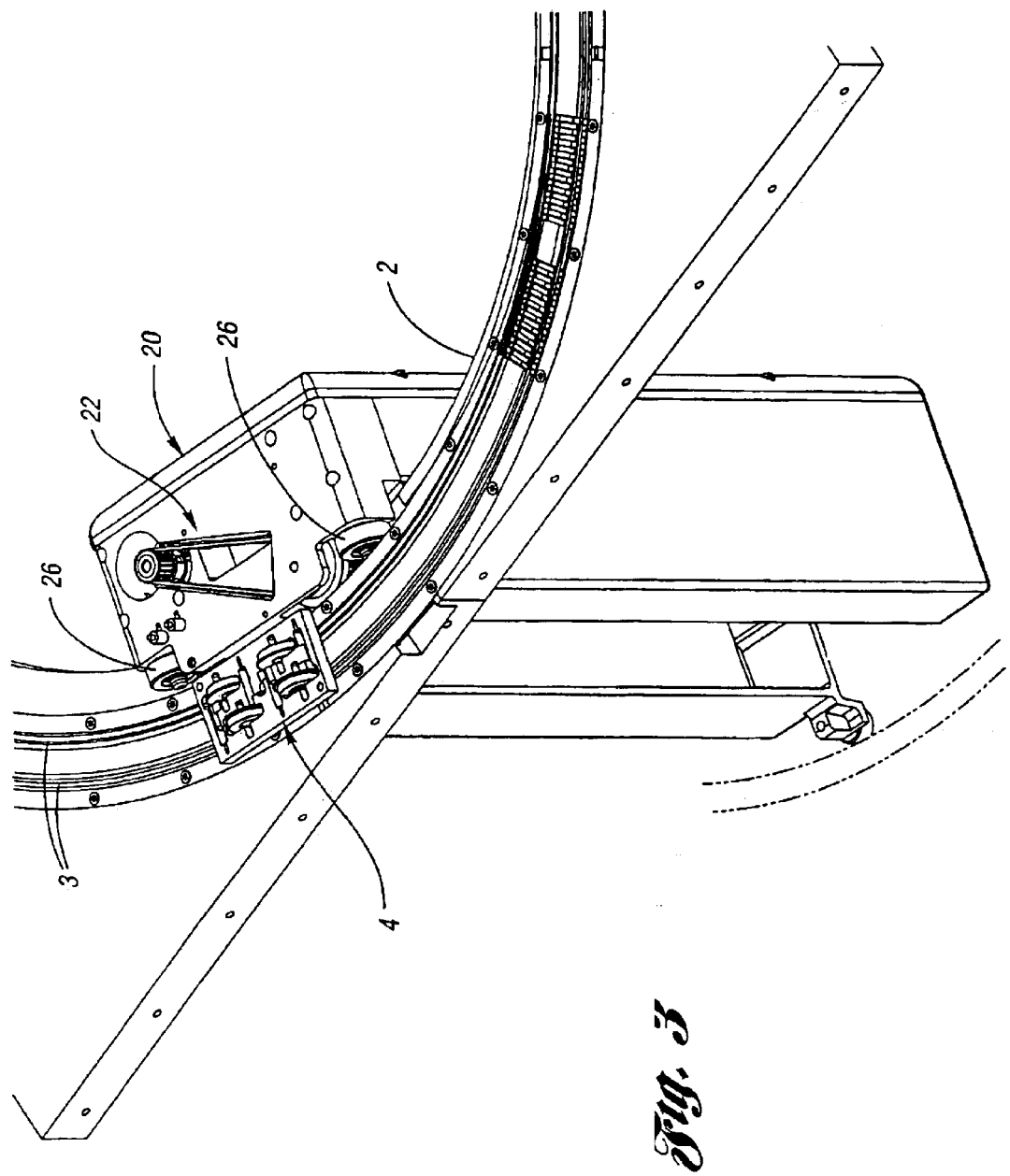
Figure 4:
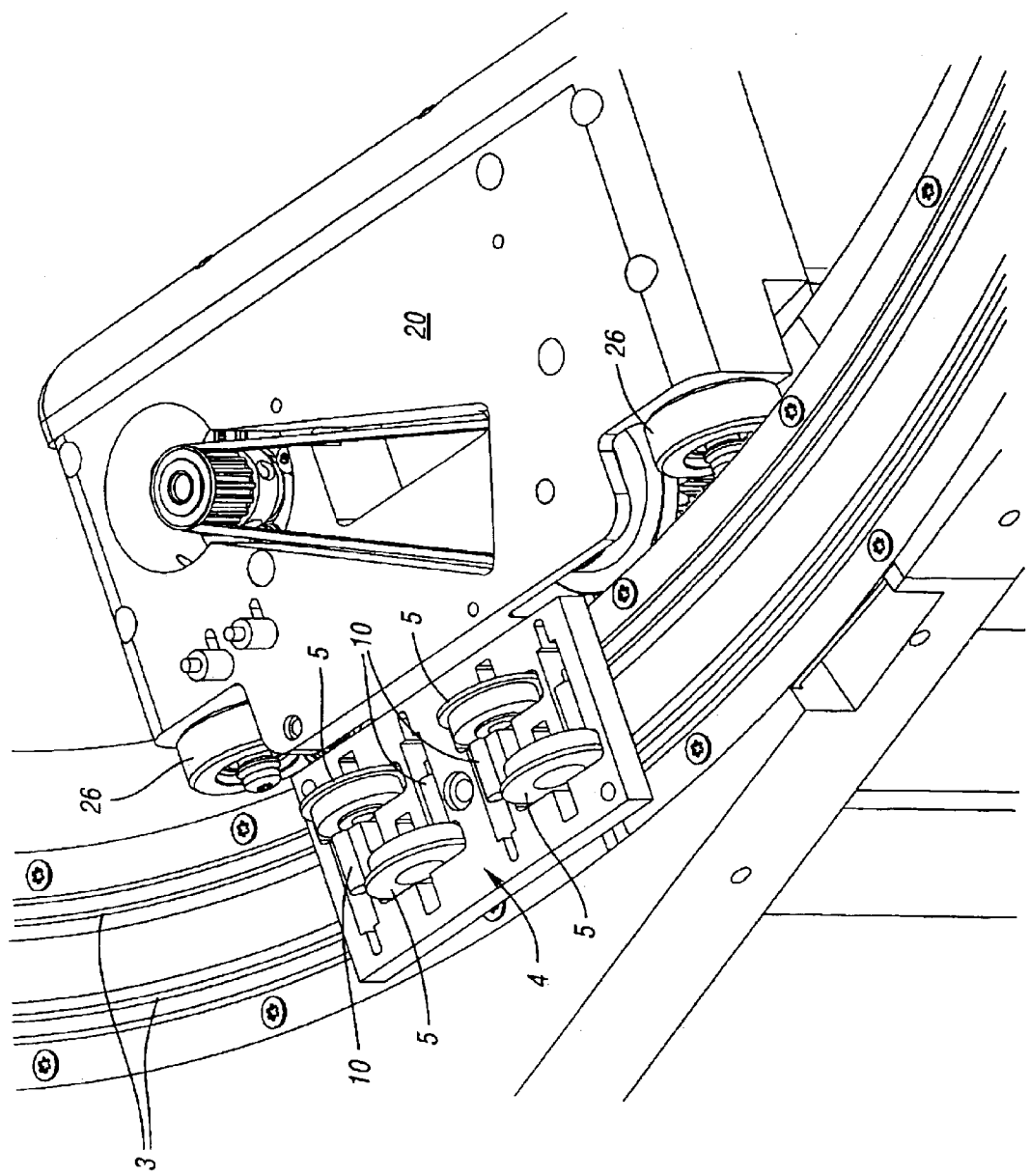
Figure 6A:
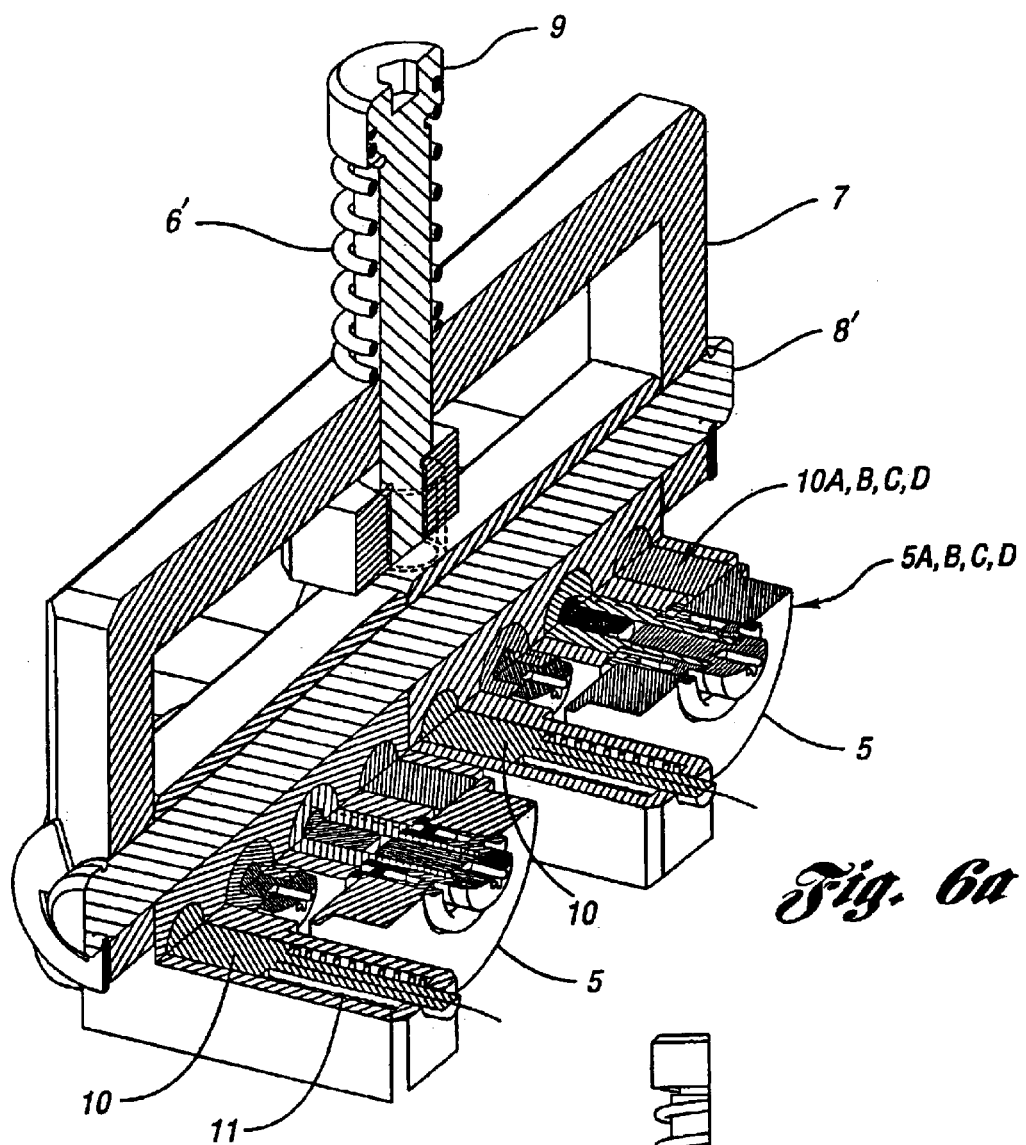
Figure 6B:
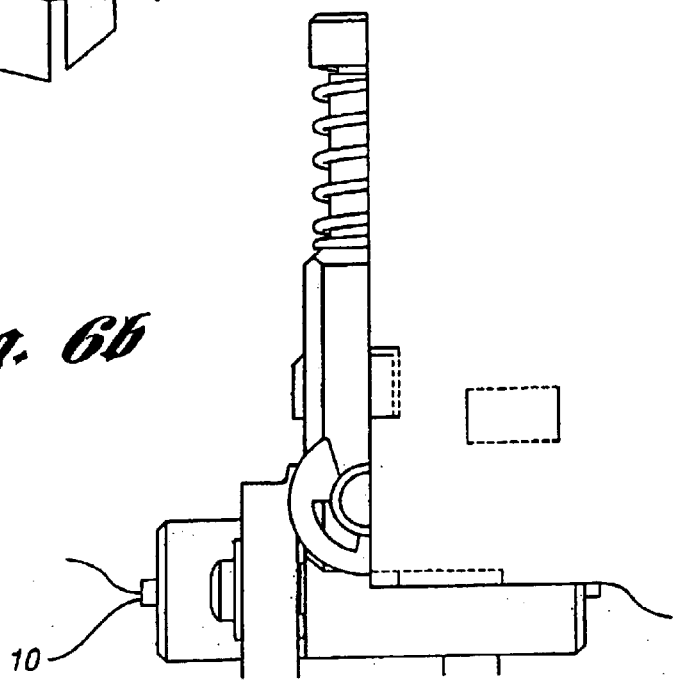

In that regard, FIGS. 1 and 2a–b show perspective and cross-sectional views, respectively, of a robotic device for use in an automated tape cartridge library having brush and strip power distribution. As seen therein, a moveable robotic device (20), which may be referred to as a "handbot" or "picker," is supported by a guide structure or rail (2A, 2B) preferably having an integrated power strip (1). Guide rail (2A, 2B) and/or power strip (1) may also be referred to as a track. Power strip (1) preferably comprises back-to-back conductive surfaces (1A, 1B), preferably copper, separated by a dielectric (preferably FR4) in a sandwich-like configuration. Power strip (1) may be a printed circuit board wherein copper conductors are laminated, glued or etched onto a substrate material. Alternatively, power strip (1) may comprise copper foil tape glued or laminated onto plastic material, or copper inserts molded into a moldable plastic material. Any other methods of construction or configurations known to those of ordinary skill may also be used.

Robotic device (20) includes brush contacts (6A, 6B, 6C, 6D) for providing power to robotic device (20). In that regard, the back-to-back conductive surfaces (1A, 1B) of power strip (1) are oppositely charged. An upper brush (6A) in contact with one conductive surface (1A), in conjunction with a corresponding lower brush (6B) in contact with the opposite conductive surface (1B) thereby supply power to the robotic device (20). Brushes (6A, 6B, 6C, 6D) are contained in housing assembly (7A, 7B) and, to ensure that contact between brushes (6A, 6B, 6C, 6D) and power strip (1) is maintained, brushes (6A, 6B, 6C, 6D) are spring loaded (8). Multiple or redundant pairs of such upper and lower brushes (6A, 6B, 6C, 6D) are preferably provided, and preferably spring loaded (8) independently, to improve robustness and reliability in the event of a brush failure, momentary loss of contact at one or more brushes due to any track irregularities, including seams or joints therein, or voltage irregularities between adjacent power strips (1). Moreover, brushes (6A, 6B, 6C, 6D) preferably have a circular cross-section, such as is provided by a cylindrical shaped brush (6A, 6B, 6C, 6D), as these are better able to traverse a joint or seam (38) in the power strip (1), which may more readily impede or catch a square shaped brush.

Power supplied to robotic device (20) through power strip (1) and brushes (6) powers a motor (not shown) in robotic device (20), which in turn drives a belt and gear system (22). Guide rails (2) includes teeth (24) which cooperate with belt and gear system (22) to permit robotic device (20) to move back and forth along guide rails (2) via guide wheels (26). As seen in FIG. 1, robotic device (20) may thereby gain access to tape cartridges stored in library cells (28) located adjacent guide rail (2).

Referring next to FIGS. 3 through 6a and 6b, various perspective, side and cross-sectional views of a robotic device for use in an automated tape cartridge library having brush and wheel power distribution are shown. As seen therein, in this alternative embodiment, robotic device (20) is supported by a guide rail (2), which is provided with a pair of oppositely charged power conductors (3), preferably in the form of copper rails. Power rails (3) supply power to robotic device (20) through power transmission carriage assembly (4). Power supplied to robotic device (20) via power rails (3) and power transmission carriage (4) powers a motor (not shown), which in turn drives belt and gear mechanism (22) to permit robotic device (20) to move back and forth along guide rail (2) via guide wheels (26).

Power transmission carriage (4) includes multiple cooperating pairs of conduction wheels (5A, 5B, 5C, 5D) (preferably copper), the individual members of a cooperating pair provided in contact, respectively, with oppositely charged conductor rails (3A, 3B). Conductive brushes (10A, 10B, 10C, 10D) are provided to contact conduction wheels (5A, 5B, 5C, 5D) and are spring loaded (11), preferably independently, to maintain such contact. To maintain contact between conduction wheels (5A, 5B, 5C, 5D) and conductor rails (3A, 3B), power transmission carriage (4) also includes vertical pre-load spring 6'). Power transmission carriage (4) still further includes gimbal arm (7) with pivot shaft 8') and pivot screw (9) for carriage compliance. Once again, multiple or redundant conduction wheel (5A, 5B, 5C, 5D) and conductive brush (10A, 10B, 10C, 10D) pairs are preferably provided, and preferably spring loaded (11) independently, to improve robustness and reliability in the event of a brush failure, momentary loss of contact at one or more wheels due to any track irregularities, including seams or joints therein, or voltage irregularities between adjacent power rails (3A, 38). In that same regard, while a single vertical pre-load spring 6') is shown, each conduction wheel (5A, 5B, 5C, 5D) could also be independently spring loaded to maintain contact with conductor rails (3A, 3B), thereby allowing for better negotiation of any track irregularities or imperfections, including joints or seams As previously described, a number of relatively large automated tape cartridge libraries are known having, for example, between 1000 and 2500 cartridge storage cells. Relatively smaller automated tape cartridge libraries, having for example on the order of 700 cartridge storage cells, are also known. For some users, as storage requirements increase, a smaller automated tape cartridge library may have to be replaced with a larger automated library, often at considerable expense. As a result, there exists a need to allow such smaller automated libraries to be linked together to create larger library systems having, for example, on the order of 1400 cartridge storage cells.

In that regard, it is known to link the above described larger automated libraries using a variety of pass-through ports and cartridge exchange mechanisms. For example, to ensure maximum access to data stored in the tape cartridges, multiple paths are created between larger automated libraries that employ cam or screw driven cartridge exchange devices. As such devices are located entirely or substantially within a library, little floor space in a data center is compromised by the device. However, the use of multiple paths and interior cartridge exchange devices result in the loss of a large number of cartridge storage cells (e.g., 24) in each library.

Alternatively, multiple larger automated libraries can be linked linearly to improve access to data. In such configurations, gravity driven cartridge exchange devices are employed between linked libraries. In operation, a tape cartridge is delivered to the cartridge exchange device by a robotic device in one of the libraries. The weight of the cartridge causes the exchange device to rotate and deliver the cartridge to the linked library, where it can be retrieved by another robotic device in that library. This configuration does not result in the loss of large number of storage cells (e.g., 4) in each library, and only minimally affects floor space. However, only a single cartridge may be passed at a time and, because the exchange device is gravity driven, another path must be provided to exchange cartridges in the opposite direction between the linked libraries. Moreover, more complex host software which sees the linked libraries as a single library, such as Automated Cartridge System Library Server (ACSLS), may be required to control the multiple linked libraries.

The pass-through ports and cartridge exchange mechanisms used in linking the relatively larger automated libraries, however, are not suitable for use in linking the relatively smaller automated libraries in that they do not meet the form factors (e.g., orientation, floor space) required by users needing 1400 cartridge storage cells. Moreover, pass-through ports and cartridge exchange devices that result in the loss of large numbers of cartridge storage cells are unacceptable because such a loss represents a significant percentage of storage space in such smaller libraries. Still further, the development of new tape cartridges having differing weights raises concerns as to the ability of gravity driven cartridge exchange devices to reliably transfer all types of cartridges.

As a result, as previously discussed, there exists a need for an improved cartridge exchange mechanism for linking automated libraries. Such an improved mechanism would preferably minimize the number of storage cells that may be lost as a result of linking automated libraries, as well as preferably minimize the amount of space required for linking such libraries. Such an improved mechanism would also preferably be capable of reliably transferring a wide variety of cartridge types.

Figure 9:
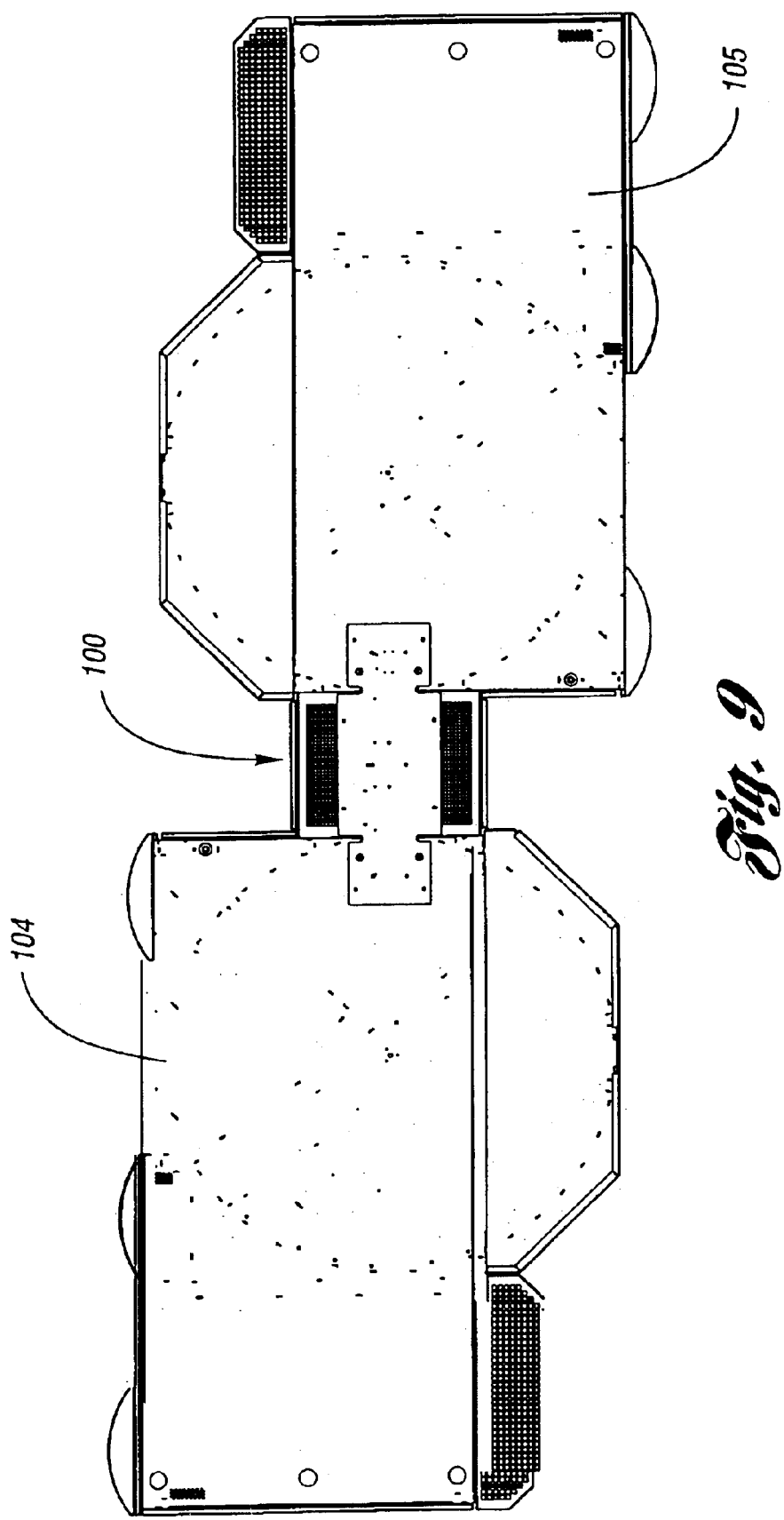
FIG. 9 is a top view of a cartridge exchange device installed between two automated tape cartridge libraries according to the present invention.
Figure 10:
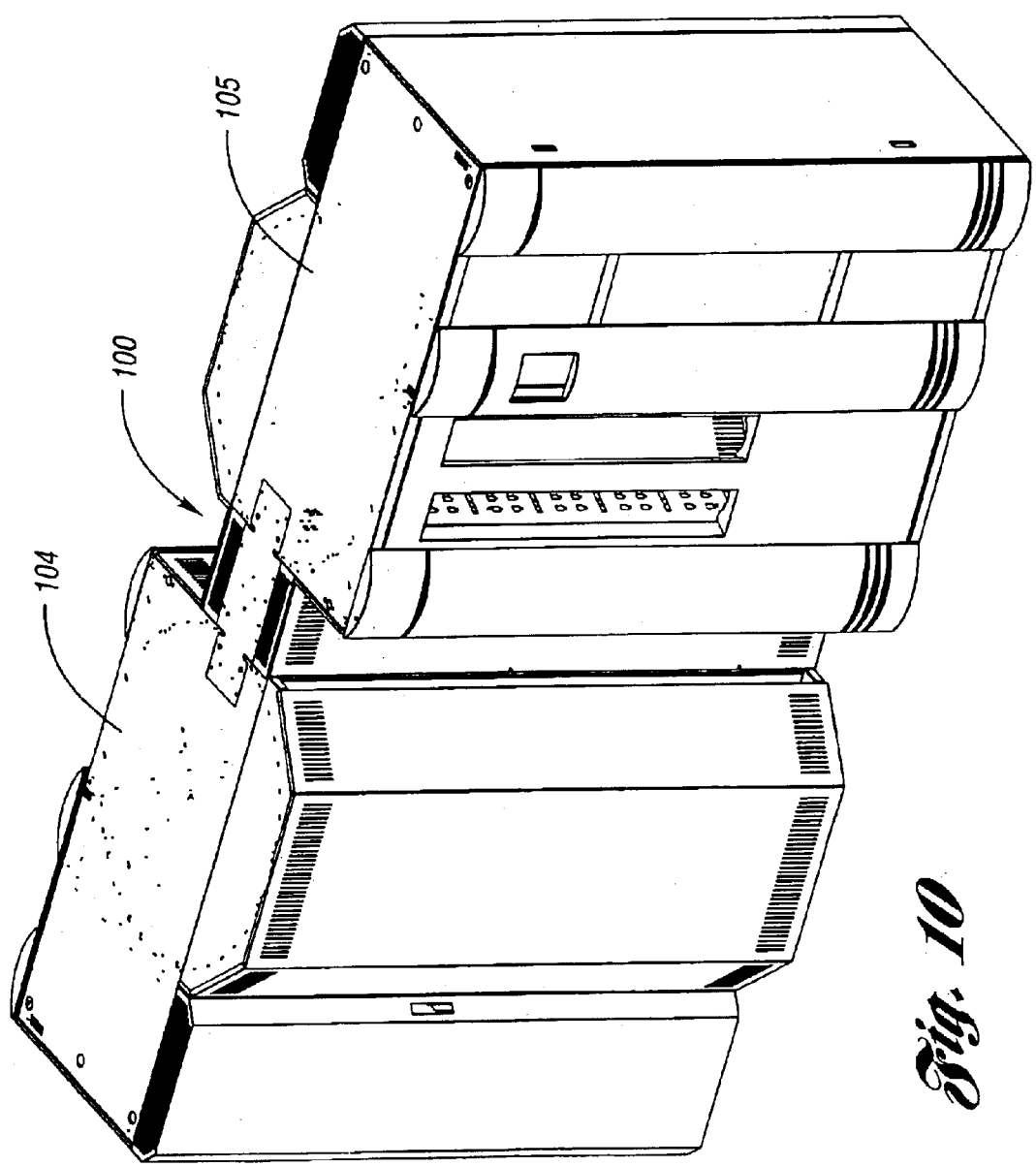
FIG. 10 is a perspective view of a cartridge exchange device installed between two automated tape cartridge libraries according to the present invention.
Figure 11:
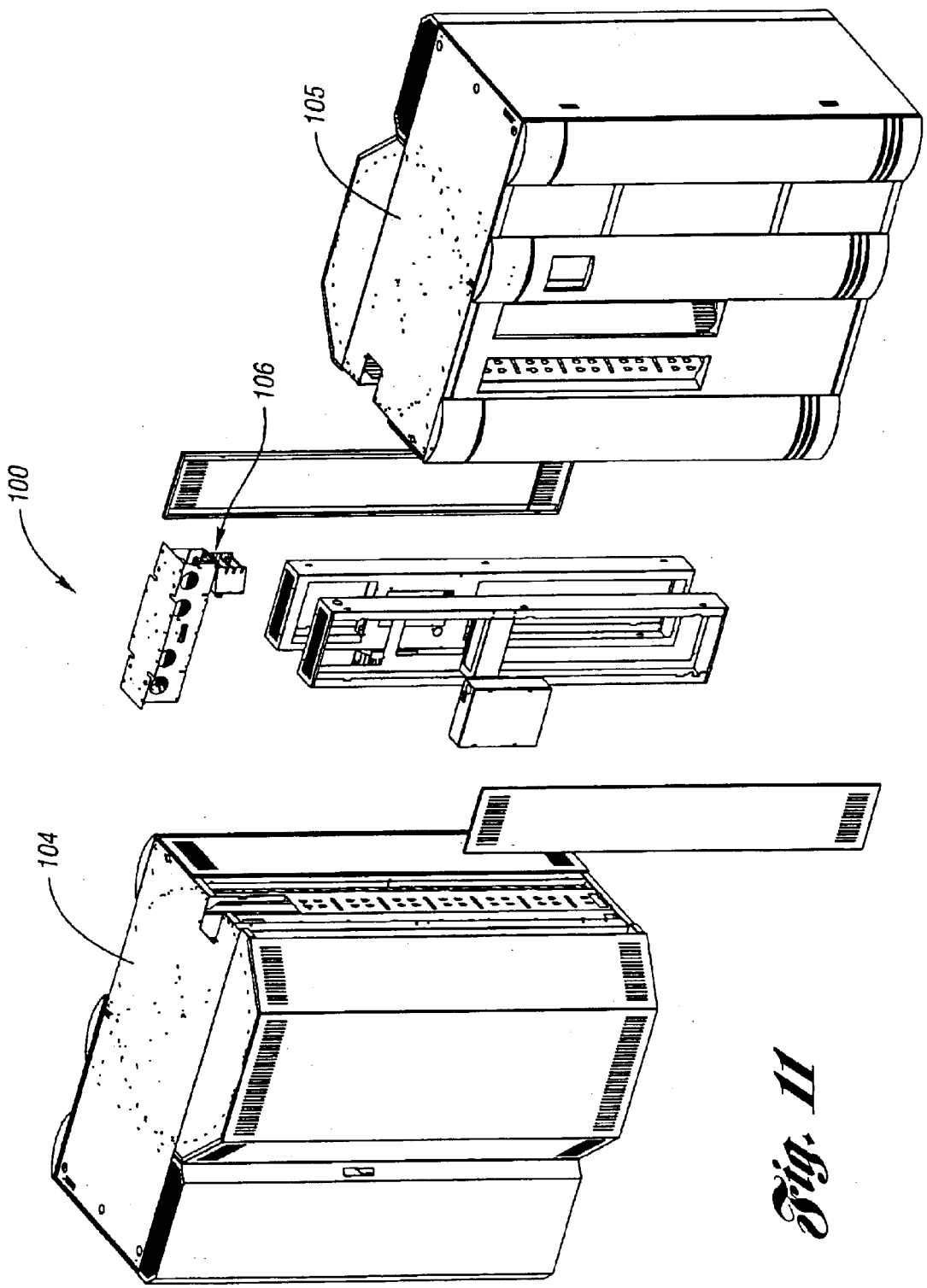
FIG. 11 is an exploded view of a cartridge exchange device installed between two automated tape cartridge libraries according to the present invention.

Referring now to FIGS. 7 and 8, perspective and exploded views of the cartridge exchange device for use in an automated tape cartridge library system according to the present invention is shown. Such a device is preferably for use in exchanging tape cartridges between two linked automated libraries having, for example, 700 cartridge storage cells each. In that regard, referring now to FIGS. 9–11, top, perspective and exploded views of the cartridge transport device installed between two such automated tape cartridge libraries according to the present invention are shown. As seen therein, and with continuing reference to FIGS. 7 and 8, cartridge exchange device (100) preferably comprises a carriage assembly (102) for transporting tape cartridges between automated libraries (104, 105). Carriage assembly (102) is preferably provided with capacity for two tape cartridges, having two tape transport cells (106).

In contrast to prior art cam or screw driven cartridge exchange devices which require extremely tight tolerances and expensive components, and which must be installed and set-up to meet specific distance requirements between libraries, device (100) is preferably motor and belt driven (108) and self-calibrated to ensure robust design. Motor and belt assembly (108) (although, alternatively, a motor and screw assembly (108') could be used) drive carriage assembly (102) back and forth between libraries (104, 105) along guide structure (110). In operation, carriage assembly (102) is originally located at one end of guide structure (110) adjacent a pass-through port or window (not shown) in one library (104), which may be referred to as a "home" position. One or two tape cartridges to be transported from library (104) to library (105) are delivered and inserted into transport cells (106) by a robotic device (not shown) within library (104) through the window (not shown). As carriage assembly (102) is driven along guide structure (110) toward library (105) to complete the exchange, rack and pinion gears (112, 114) operate to cause carriage assembly (102) to rotate approximately 180° so that transport cells (106) face a pass-through port or window (not shown) in library (105). Upon arrival of carriage assembly (102) at library (105), which may be referred to as an "away" position, the one or more tape cartridges in transport cells (106) are retrieved by one or more robotic devices (not shown) within library (105) through the window (not shown). The use of such rack and pinion gears (112, 114) permits carriage assembly (102) to rotate in a relatively small space, allowing device (100) to operate within the form factors, particularly floor space, required by users of such library systems.

Figure 12:
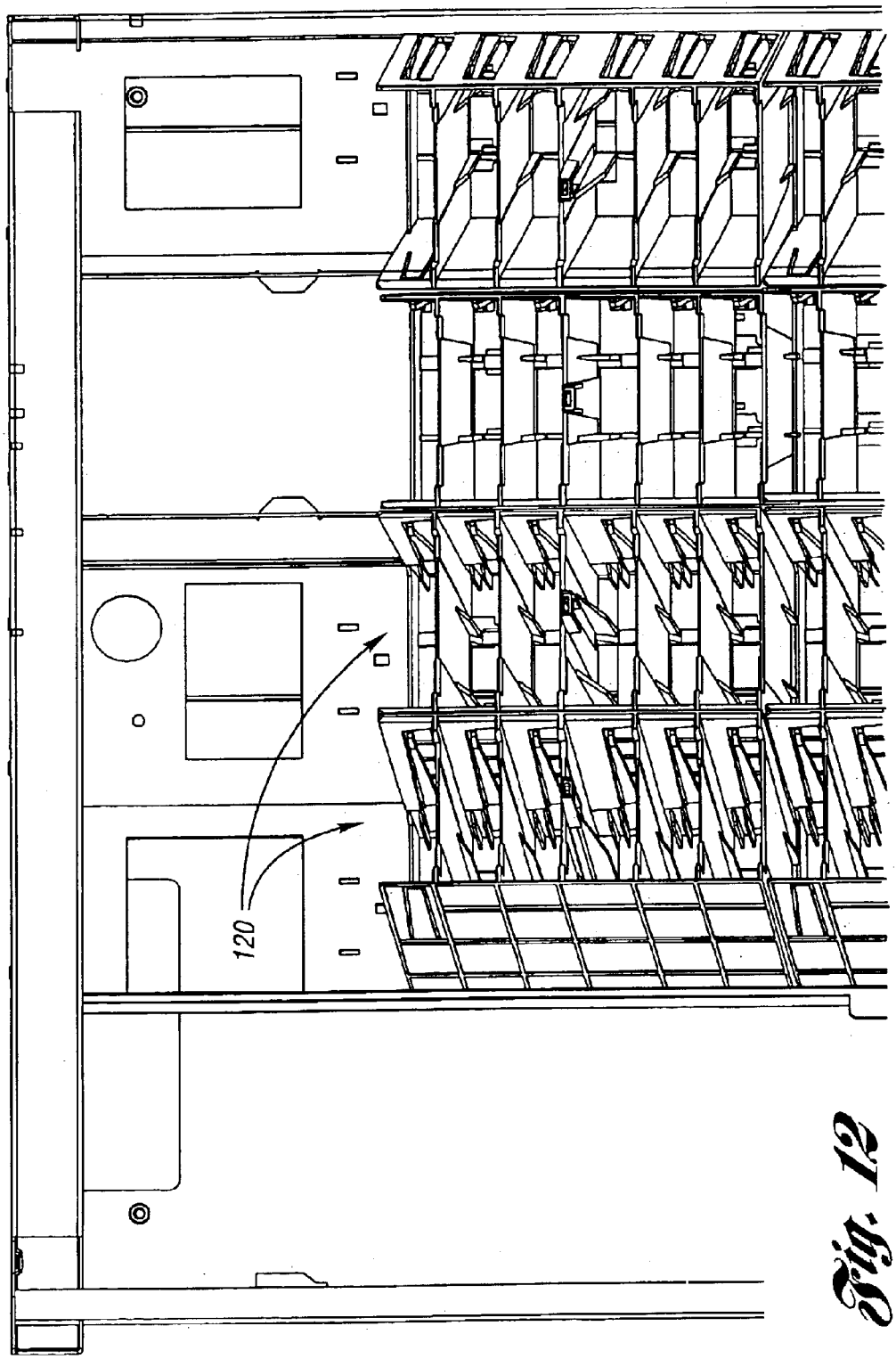
FIG. 12 is a partial perspective view of an array of multiple cartridge storage cells in the interior of an automated tape cartridge library.
Figure 13:
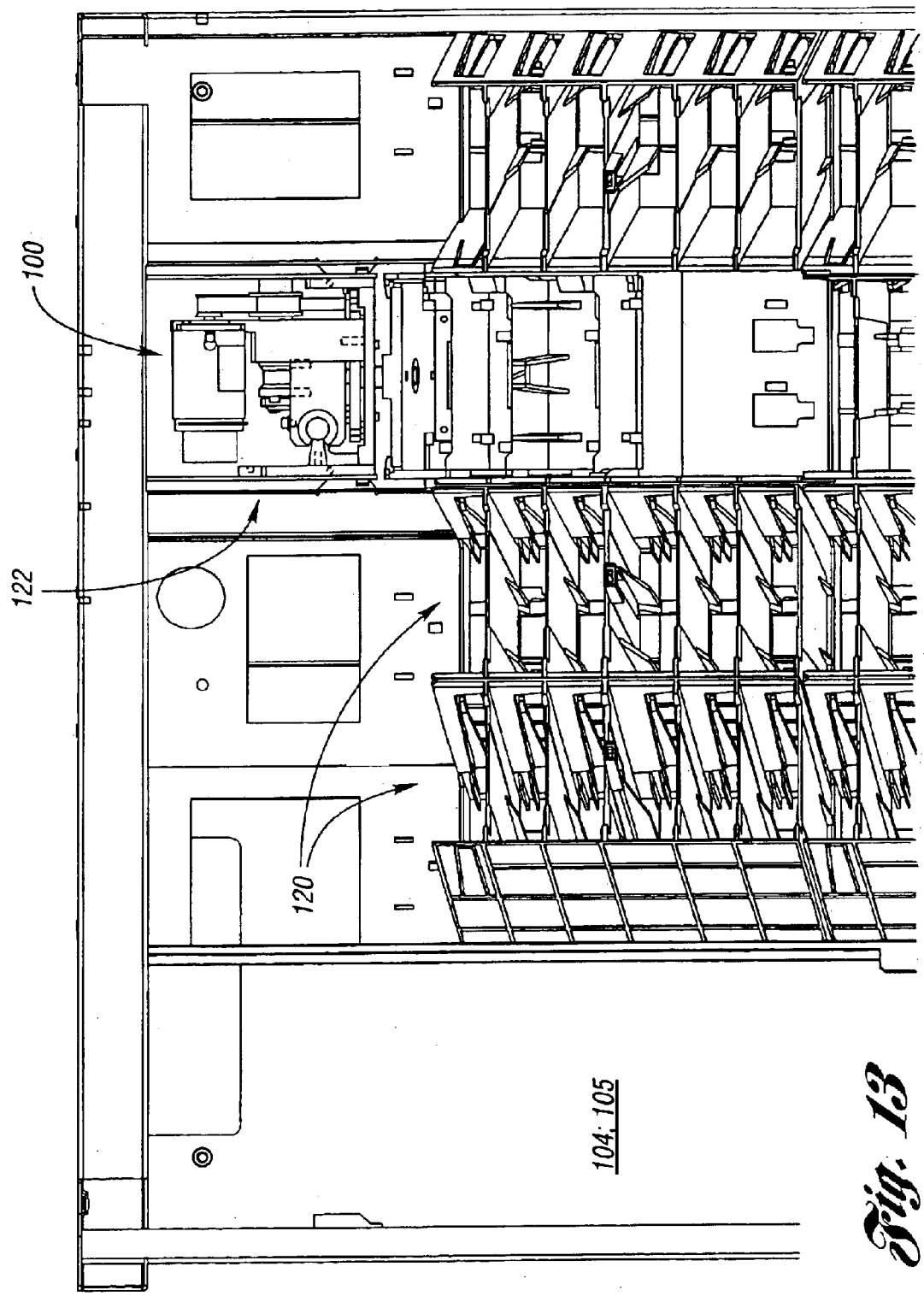
FIG. 13 is a partial perspective view of an array of multiple cartridge storage cells in the interior of an automated tape cartridge library having an installed cartridge exchange device according to the present invention.

FIG. 12 depicts a partial perspective view of an array of multiple cartridge storage cells (120) in the interior of an automated tape cartridge library. FIG. 13 depicts a partial perspective view of an array of multiple cartridge storage cells (120) in the interior of an automated tape cartridge library (104, 105) having an installed cartridge exchange device (100) according to the present inventions. As seen from those figures, as well as from FIGS. 9–11, the linear transport path of device (100) between libraries (104, 105) results in minimal loss of cartridge storage cells (120). As shown in FIG. 13, only six such storage cells (120) are lost per library (104, 105), although device (100) occupies the space of only three such storage cells (120). FIG. 24 also shows the narrow pass-through port or window (122) required for operation of device (100), again limiting the loss of storage cells (120) and increasing tape cartridge density within libraries (104, 105). Moreover, as device (100) is not gravity driven, it can reliably transport all types of tape cartridges and need not be fine tuned in light of the development of new cartridges.

Figure 14:
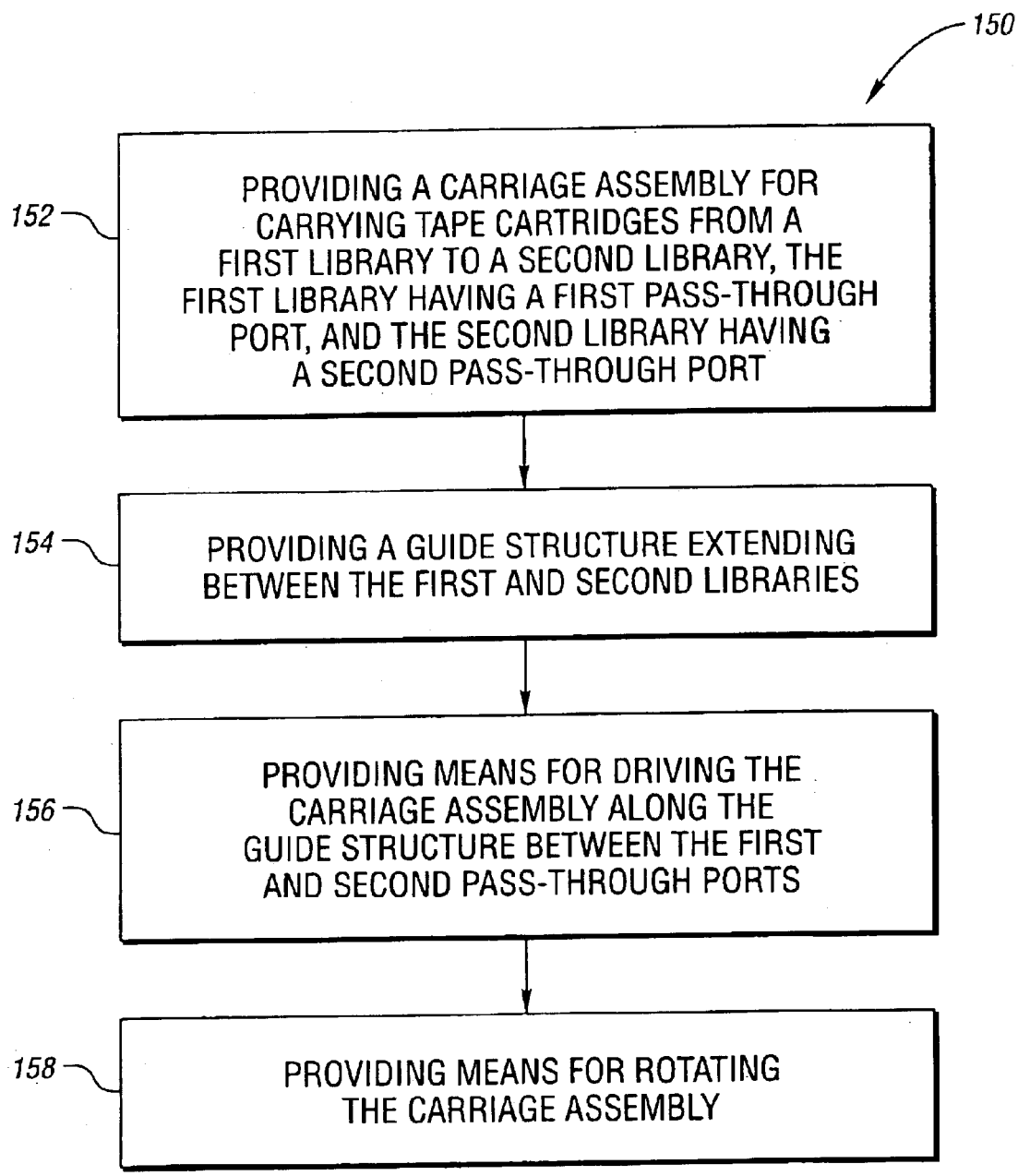
FIG. 14 is a simplified, exemplary flowchart depicting the method of the present invention.

Referring next to FIG. 14, a simplified, exemplary flowchart depicting the method of the present invention is shown, denoted generally by reference numeral 150. The method (150) is for exchanging tape cartridges between first and second libraries and is provided for use in an automated tape cartridge library system having a first library and a second library, each of the first and second libraries having a plurality of storage cells for housing tape cartridges and a robotic device for moving the tape cartridges in the library. As seen in FIG. 14, the method (150) comprises providing (152) a carriage assembly for carrying tape cartridges from the first library to the second library and from the second library to the first library, the carriage assembly comprising at least one cartridge transport cell, wherein the carriage assembly has a substantially vertical axis and is adapted to cooperate with a first pass through port in the first library for providing access to the plurality of storage cells in the first library and a second past through part in the second library for providing access to the plurality of storage cells in the second library.

The method (150) further comprises providing (154) a guide structure extending between the first and second libraries for supporting the carriage assembly, the guide structure defining a linear path and having first and second sides substantially parallel to the linear path, the first and second sides defining an envelope. The method (150) still further comprises providing (156) means for driving the carriage assembly along the guide structure between the first and second pass through ports, and providing (158) means for rotating the carriage assembly about the substantially vertical axis, wherein the at least one cartridge transport cell is accessible by the robotic device of the first library when the carriage assembly is aligned with the first pass through port, the rotating means automatically rotates the carriage assembly substantially within the envelope as the driving means drives the carriage assembly along the guide structure between the first and second libraries, and the at least one cartridge transport cell is accessible by the robotic device of the second library when the carriage assembly is aligned with the second pass through port.

It should be noted that the simplified flowchart depicted in FIG. 14 is exemplary of the method of the present invention. In that regard, the steps of such method may be executed in sequences other than those shown in FIG. 14, including the execution of one or more steps simultaneously.

Thus it is apparent that the present invention provides an improved cartridge exchange mechanism for linking automated libraries. In that regard, the cartridge exchange device of the present invention minimizes the number of storage cells that may be lost as a result of linking automated libraries, as well as minimizes the amount of space required for linking such libraries. The cartridge exchange device of the present invention is further capable of reliably transferring a wide variety of cartridge types.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. In an automated tape cartridge library system having a first library and a second library, each of the first and second libraries having a plurality of storage cells for housing tape cartridges and a robotic device for moving the tape cartridges in the library, a system for exchanging tape cartridges between the first and second libraries comprising:

a carriage assembly for carrying tape cartridges from the first library to the second library and from the second library to the first library, the carriage assembly comprising at least one cartridge transport cell adapted to cooperate with a first pass through port In the first library for providing access to the plurality of storage cells in the first library and a second pass through port in the second library for providing access to the plurality of storage cells in the second library;

a guide structure extending between the first and second libraries for supporting the carriage assembly, the guide structure defining an envelope;

a drive mechanism for driving the carriage assembly along the guide structure between the first and second pass through ports; and a rotation mechanism for rotating the carriage assembly, wherein the at least one cartridge transport cell is accessible by the robotic device of the first library when the carriage assembly is aligned with the first pass through port, the rotation mechanism automatically rotates the carriage assembly substantially within the envelope as the drive mechanism drives the carriage assembly along the guide structure between the first and second libraries, and the at least one cartridge transport cell is accessible by the robotic device of the second library when the carriage assembly is aligned with the second pass through port;

wherein the rotation mechanism comprises a first toothed member and a second toothed member cooperating to rotate the carriage assembly between a first position for alignment with the first pass through port and a second position for alignment with the second pass through port.

2. The cartridge exchange system of claim 1 wherein the first toothed member comprises a pinion gear coupled to the carriage assembly and the second toothed member comprises a linear rack coupled to the guide structure.

3. The cartridge exchange system of claim 1 wherein the first and second toothed members rotate the carriage assembly approximately 180° about a vertical axis.

4. The cartridge exchange system of claim 1 wherein the drive mechanism for driving the carriage assembly along the guide structure comprises a motor and belt assembly.

5. The cartridge exchange system of claim 1 wherein the drive mechanism for driving the carriage assembly along the guide structure comprises a motor and screw assembly.

6. The cartridge exchange system of claim 1 wherein the carriage assembly is suspended from the guide structure.

7. The cartridge exchange system of claim 1 wherein the first and second libraries each comprise approximately 700 tape cartridge storage cells.

8. The cartridge exchange system of claim 1 wherein the automated tape cartridge library system further comprises a controller for controlling the robotic devices of the first and second libraries, and the cartridge exchange system is adapted to be controlled by the controller.

9. The cartridge exchange system of claim 1 wherein the cartridge exchange system is located substantially outside both the first and the second libraries to reduce a number of tape cartridge storage cells in each of the first and second libraries lost as a result of linking the first and second libraries in the automated library system.

10. The cartridge exchange system of claim 9 wherein the at least one cartridge transport cell comprises two cartridge transport cells so that the first and second pass through ports are provided with a sufficiently small area to reduce the number of tape cartridge storage cells in each of the first and second libraries lost as a result of the linking the first and second libraries in the automated library system.

* * * * *